United States Patent [19]
Clifford et al.

[11] Patent Number: 6,040,897
[45] Date of Patent: Mar. 21, 2000

[54] REMOTE SENSOR HEAD FOR LASER LEVEL MEASUREMENT DEVICES

[75] Inventors: Bruce Clifford, Ontario, Canada; John Harrison, Shalimar, Fla.

[73] Assignee: Laser Technology, Inc., Englewood, Colo.

[21] Appl. No.: 09/069,447

[22] Filed: Apr. 29, 1998

[51] Int. Cl.$^7$ .............................. G01C 3/08; G01F 23/00
[52] U.S. Cl. ..................... 356/4.01; 73/290 R; 73/293
[58] Field of Search ................... 356/4.01, 3.01, 356/5.01, 5.1; 73/293, 290 R

[56] References Cited

U.S. PATENT DOCUMENTS

| | | | |
|---|---|---|---|
| 3,995,169 | 11/1976 | Oddon | 250/577 |
| 4,051,726 | 10/1977 | Hastbaka | 73/290 R |
| 4,354,180 | 10/1982 | Harding | 340/619 |
| 4,670,660 | 6/1987 | Kuhlen et al. | 250/577 |
| 4,938,590 | 7/1990 | Ishida | 356/5 |
| 5,020,901 | 6/1991 | De Groot | 356/5 |
| 5,257,090 | 10/1993 | Meinzer et al. | 356/358 |
| 5,278,426 | 1/1994 | Barbier | 250/577 |
| 5,319,973 | 6/1994 | Crayton | 73/290 V |
| 5,406,842 | 4/1995 | Locke | 73/290 R |
| 5,438,867 | 8/1995 | van der Pol | 73/290 V |
| 5,478,966 | 12/1995 | Sugi | 73/313 |

*Primary Examiner*—Stephen C. Buczinski
*Attorney, Agent, or Firm*—John D. Gugliotta

[57] ABSTRACT

Disclosed is an optical sensor used for remote laser level monitoring in liquid storage vessels. The sensor is mounted directly to a standard tank nipple, located on top of the vessel, by a threaded connecting means and is linked to a laser measurement device via fiber optic cabling. The level in the vessel is measured as a function of the time required for a laser signal to be transmitted from the sensor, reflected off the liquid surface and returned to the receiver lens located in the sensor.

9 Claims, 4 Drawing Sheets

REMOTE SENSOR HEAD FOR LASER LEVEL MEASUREMENT DEVICES

BACKGROUND OF THE INVENTION

1. Field of the Invention

The present invention relates generally to instrumentation devices used to transmit level indication signals from a remote location to a local indicating station or microprocessor and, more particularly, to a remote optical sensor head connected to a laser measurement device via fiber optic cables that is used to monitor levels in liquid storage vessels.

2. Description of the Related Art

In many industrial applications, it is common practice to monitor fluid levels in liquid storage vessels located in remote areas using instrumentation equipment that transmits a level indicating signal to a centralized location for monitoring and control purposes. In the past, several methods have been utilized in obtaining these remotely generated level indicating signals. However, most are flawed in the sense that they are susceptible to drawbacks and intrinsic characteristics that often result in inaccurate measurements.

Mechanical, float-type level indicating devices have been used to indicate fluid levels by placing a float in the vessel itself. As the float raises and lowers with the fluid level in the vessel, a variable resistance electronic device is manipulated, thus providing a means by which the level is measured in proportion to the variable resistance. While this method provides accurate readings, it requires frequent calibration and is limited in use to liquids that will not deteriorate the hardware. Furthermore, turbulent conditions within the vessel can also lead to inaccurate measurements. Similarly, mechanical float-type level limit switches suffer from the same limitations as the level indicators, although calibration is not as great a factor.

The drawbacks associated with the aforementioned devices gave rise to the development of other devices that do not rely on direct contact with the liquid. Ultrasonic level detectors utilize a transmitter/receiver to detect liquid levels by transmitting a signal from the top of the vessel and monitoring the time required for it to be reflected off the surface of the liquid and return to the receiver. While this method eliminates many of the problems associated with mechanical devices, it too suffers from inaccuracies caused by varying temperatures and densities in the area above the fluid level inside the vessel.

Using principles similar to those of ultrasonic indicators, microwave and radar level indicators use their respective signal types to indicate liquid levels without coming into direct contact with the liquid. However, these methods too suffer from limitations in the sense that liquids with poor dielectric constants cause inaccurate level indications.

Other limitations associated with the ultrasonic, radar and microwave devices results from the fact that these devices are electronic in nature and therefore suffer from intrinsic safety concerns. As with any electronic device, there are, necessarily, heat generating components that create, no matter how remote, the possibility of hazardous situations when used in areas where flammable materials are present. Furthermore, electronic devices also suffer from complications created by line noise, electromagnetic field interference (EMF) and grounding problems. The aforementioned limitations associated with the use of these devices has lead to the development of alternative methods, including the use of laser and optical instrumentation devices. However, depending upon their configuration, these devices also suffer from inadequacies and drawbacks that identify the present invention as being a superior method of measurement In the ancillary art, several devices have been developed that utilize laser based devices to calculate and indicate fluid levels within liquid storage vessels. For example, U.S. Pat. No. 5,257,090, issued in the name of Meinzer et al, discloses a laser liquid level/distance measuring device wherein a laser beam is aimed vertically downward into the vessel and is reflected from a floating reflector back to an optical receiver. The level is then calculated as being proportional to the time required for a transmitted signal to be reflected back to the receiver. This method suffers from drawbacks because, as previously mentioned, the device requires submersion in the liquid itself which can lead to problems associated with corrosion and turbulence within the vessel. This method also suffers from the aforementioned intrinsic safety concerns related to electronic devices.

U.S. Pat. No. 4,938,590, issued in the name of Ishida, similar in nature to the Meinzer invention, includes a means to compensate for varying vessel pressure. However, this invention also suffers from the corrosion and turbulence problems because it also requires submersion and is susceptible to intrinsic safety concerns due to its electronic nature.

U.S. Pat. No. 5,020,901, issued in the name of de Groot, discloses a laser range detector used to measure the distance between objects. Although related to the present invention in the sense that it uses a similar method for measurement, this device is not intended for use in level measurement. Furthermore, this device relies on a reflector being located at the same location as the remote object. Therefore, any adaptation for liquid level measurement would require submersion and result in the same problems associated therewith.

U.S. Pat. No. 5,278,426, issued in the name of Barbier, discloses an optical liquid level limit switch-type sensor wherein the sensor module is mounted on the sidewall of the vessel facing the interior thereof. The device consists of a light transmitter and a light detecting receiver. In the absence of liquid at the sensor level, the amount of light reflected and detected by the receiver is substantially greater than when the liquid is present. Thus the device indicates when the liquid in the storage vessel reaches a level equal to that of the sensor. While this invention overcomes the problems associated with submersion previously discussed, it does rely on electronics being located at the sensor and therefore suffers from the problems associated therewith, including noise, EMF, grounding and fire hazards.

U.S. Pat. No. 3,995,169, issued in the name of Oddon and U.S. Pat. No. 4,051,726, issued in the name of Hastbacka, disclose optical level indicating devices for liquid storage vessels wherein transparent, light conducting probe rods are submersed in the liquid. Knowing that the amount of light transmitted through the probe is a function of the liquid level within the vessel, the level is determined by calculating the extent to which light is refracted by the surrounding liquid. By definition, these devices require submersion and are therefore susceptible to the problems associated therewith. These devices also suffer from intrinsic safety concerns due to the fact that they are electronic in nature.

Examples of level indicating devices that utilize ultrasonic; microwave and radar principles, and that display the aforementioned problems associated with devices of this nature are displayed by the following:

U.S. Pat. No. 5,406,842, issued in the name of Locke;

U.S. Pat. No. 5,438,867, issued in the name of van der Pol; and

U.S. Pat. No. 5,319,973, issued in the name of Crayton et al.

Finally, other devices that demonstrate methods of level detection and indication, do not necessarily relate directly to the present invention, but warrant inclusion for reference purposes include:

U.S. Pat. No. 4,354,180, issued in the name of Harding;

U.S. Pat. No. 4,670,660, issued in the name of Kuhlen et al; and

U.S. Pat. No. 5,478,966, issued in the name of Sugi.

A search of the previous art did not disclose any patents that read directly on the claims of the instant invention. Consequently, a need has been felt for providing a level indicating device for use in liquid storage vessels that provides accurate indications while avoiding the previously stated problems associated with other conventional methods.

SUMMARY OF THE INVENTION

Briefly described according to a preferred embodiment, the present invention consists of an optical sensor head used for remote laser level monitoring in liquid storage vessels. The sensor head is contained within a housing that is designed to mount directly to a standard tank nipple or flange via a threaded connecting means and is connected to a laser measurement device via fiber optic cabling. By directing the sensor perpendicular to the surface of the liquid in the vessel, the level therein can be determined by monitoring the time required for a pulsed or continuous wave phase laser to be transmitted from the sensor head, reflected off the liquid surface and returned to a receiver lens located in the sensor head. A single laser measuring device can be used to provide redundant level measuring signals within the same vessel or single level indicating signals in multiple tanks by installing several sensor heads and multiplexing them using a standard optical switching system.

It is therefore an object of the present invention to provide an improved level indicating means for use with liquid storage vessels that provides an accurate indication of the fluid level within the vessel.

It is another object of the present invention to provide an improved level indicating means for use with liquid storage vessels that utilizes an optical sensor head contained within a housing that is designed to mount directly to a standard tank nipple or flange via a threaded connecting means and is connected to a laser measurement device via fiber optic cabling.

It is another object of the present invention to provide an improved level indicating means for use with liquid storage vessels in which a single laser measuring device can be used to monitor redundant level measuring signals within the same vessel or single level indicating signals in multiple tanks by installing several sensor heads and multiplexing them using an optical switching system.

It is another object of the present invention to provide an improved level indicating means for use with liquid storage vessels that does not require submersion in the liquid stored in the vessel in order to operate.

It is another object of the present invention to provide an improved level indicating means for use with liquid storage vessels that isolates the optical measuring components from the harmful effects of substances within the vessel.

It is another object of the present invention to provide an improved level indicating means for use with liquid storage vessels that does not require vessel draining or cause leakage during maintenance or replacement.

It is another object of the present invention to provide an improved level indicating means for use with liquid storage vessels that is designed to withstand high pressure exerted on the sensor head by the liquid within the vessel and/or pressure within a sealed vessel.

It is another object of the present invention to provide an improved level indicating means for use with liquid storage vessels that is easy to install and calibrate.

It is another object of the present invention to provide an improved level indicating means for use with liquid storage vessels whose optical transmitting and receiving lenses are easily focused.

It is another object of the present invention to provide an improved level indicating means for use with liquid storage vessels that can be easily adjusted so as to aim perpendicular to the surface of the liquid within the vessel.

It is another object of the present invention to provide an improved level indicating means for use with liquid storage vessels that does not require frequent re-calibration.

It is another object of the present invention to provide an improved level indicating means for use with liquid storage vessels that incorporates the use of a reference signal by using prisms to reflect a portion of the transmitted laser to the receiver.

It is another object of the present invention to provide an improved level indicating means for use with liquid storage vessels that incorporates the use of a reference signal by using fiber optic couplers to direct a portion of the transmitted optical pulse to the receiver.

It is another object of the present invention to provide an improved level indicating means for use with liquid storage vessels that improves accuracy by the incorporation of a reference signal.

It is another object of the present invention to provide an improved level indicating means for use with liquid storage vessels that reduces or eliminates the effects of fiber length, and the linear expansion/shrinkage thereof, by the incorporation of a reference signal.

Finally, it is an object of the present invention to provide an improved level indicating means for use with liquid storage vessels that is sealed in a manner such that it is waterproof and can withstand installation in locations exposed to outdoor weather conditions.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

10 Sensor Head
11 Base
12 Sleeve
13 Leveling Screw
14 Rubber Gasket
15 Fastening Threads
20 Window
21 Window Securing Ridge
22 Window Retaining Ring
23 O-Ring
30 Transmitter Lens
31 Transmitter Lens Assembly
32 Transmitter Lens Retaining Ring
33 Transmitter Lens Locking Screw
35 Receiver Lens
36 Receiver Lens Assembly
37 Receiver Lens Retaining Ring
40 Receptacle Base Fastener
41 Transmitter Receptacle Base
42 Transmitter Receptacle
43 Receiver Receptacle Base
44 Receiver Receptacle
45 Circular Bubble Level
50 Liquid Storage Vessel
51 NPT Nipple-Type Connector
52 Liquid Surface
55 Transmitter Fibers
56 Receiver Fibers
57 Fiberoptic Terminating Connectors
58 Laser Measurement Device

DESCRIPTION OF THE PREFERRED EMBODIMENTS

In order to describe the complete relationship of the invention, it is essential that some description be given to the manner and practice of functional utility and description thereof. Accordingly, the best mode for carrying out the invention is presented in terms of its preferred embodiment, herein depicted within the figures.

1. Detailed Description of the Figures

Figure 1:
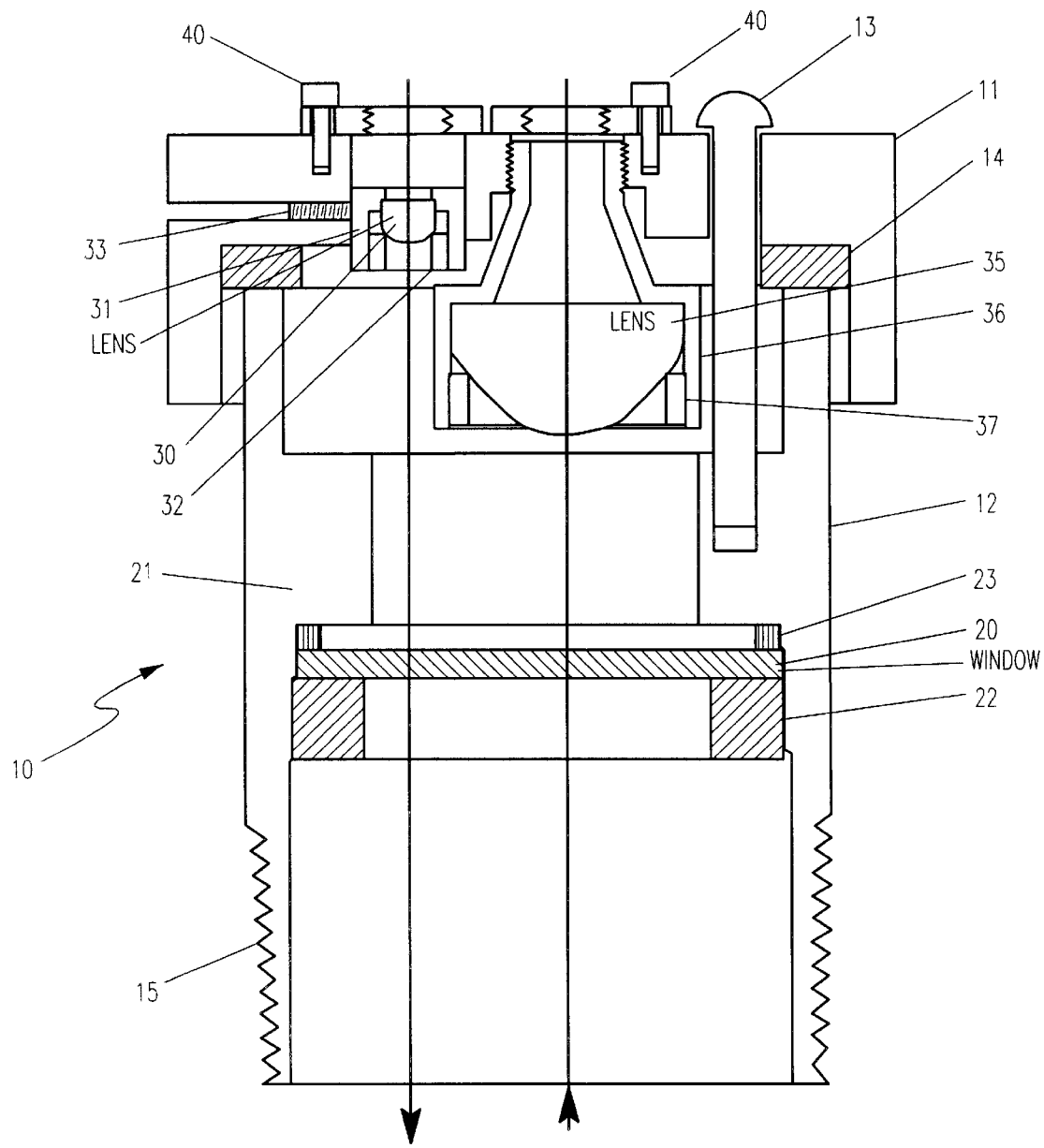
FIG. 1 is a side cutaway view of a remote sensor head for laser level measurement in liquid storage vessels according to the preferred embodiment of the present invention.
Figure 2:
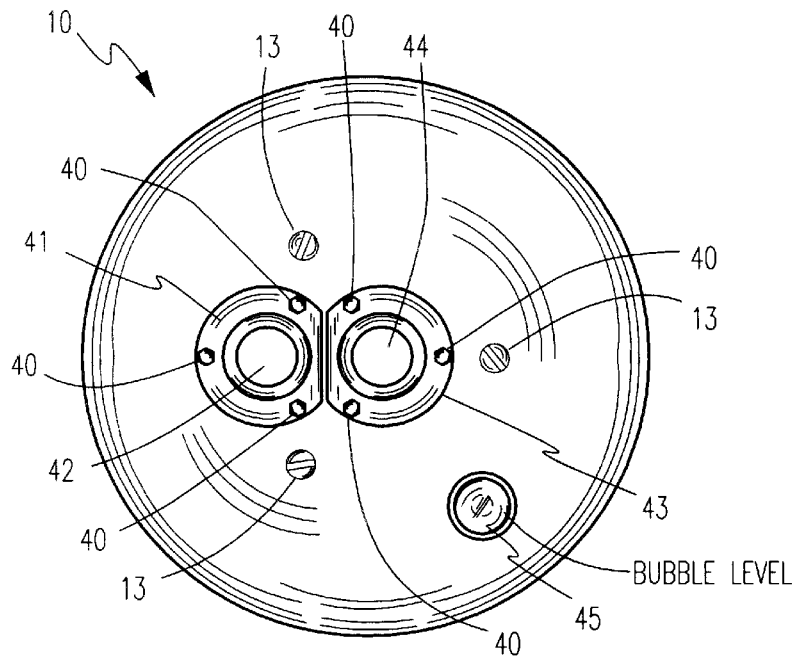
FIG. 2 is a top view of a remote sensor head for laser level measurement in liquid storage vessels according to the preferred embodiment of the present invention.
Figure 3:
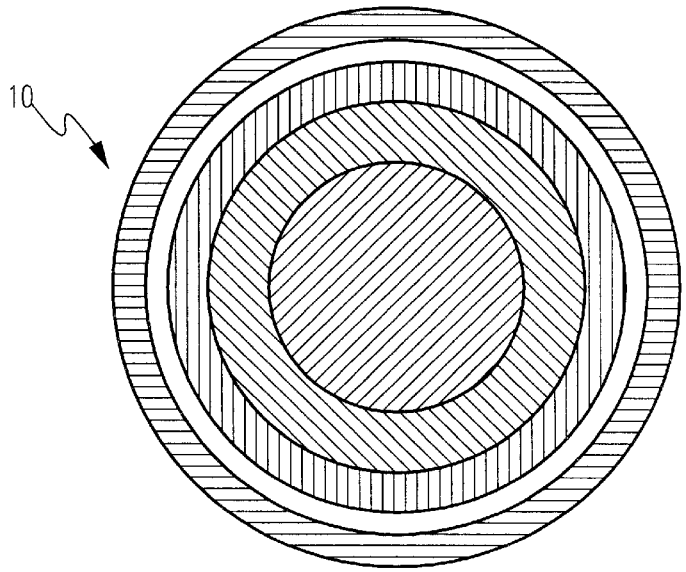
FIG. 3 is a bottom view of a remote sensor head for laser level measurement in liquid storage vessels according to the preferred embodiment of the present invention.
Figure 4:
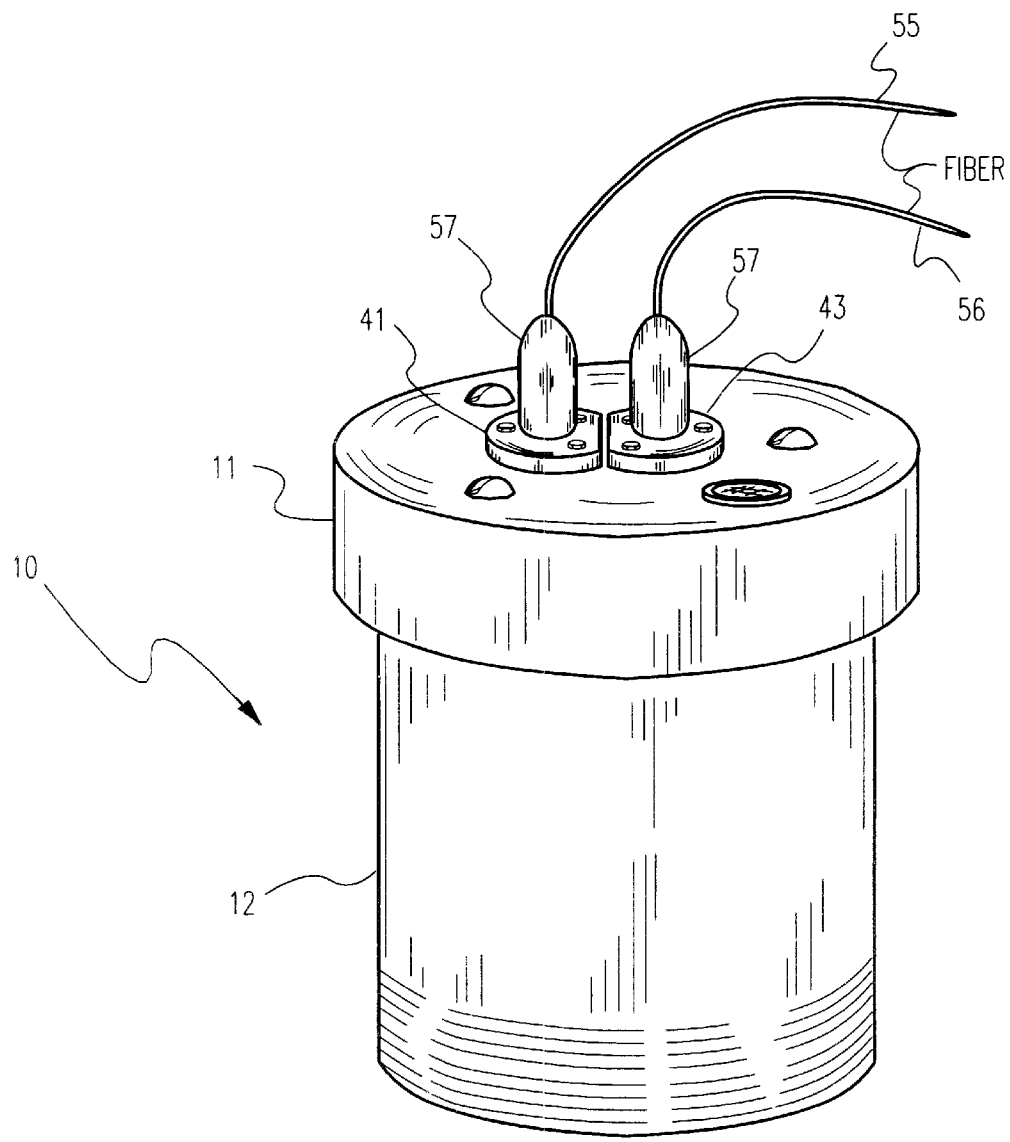
FIG. 4 is a perspective view of a remote sensor head for laser level measurement in liquid storage vessels according to the preferred embodiment of the present invention.
Figure 5:
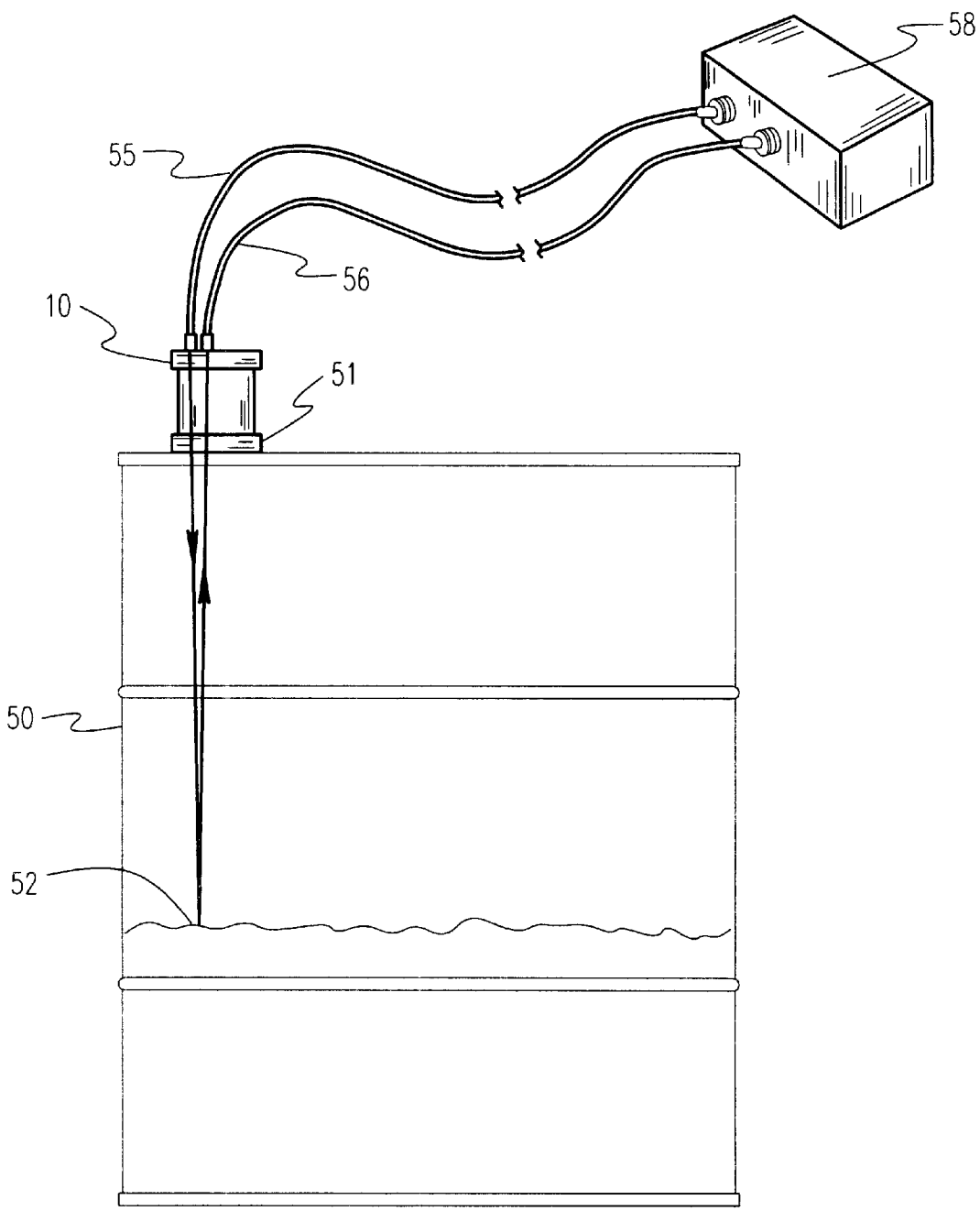
FIG. 5 is a profile diagram depicting an operational implementation of the remote sensor head for laser level measurement in liquid storage vessels according to the preferred embodiment of the present invention.

Referring now to FIG. 1, FIG. 2 and FIG. 3, illustrated is a remote sensor head for laser level measurement in liquid storage vessels 10, hereinafter sensor head. The sensor head 10 houses equipment, described in detail hereinafter, used to obtain accurate level measurements when used in conjunction with a laser measurement device (not shown). The housing portion of the sensor head 10 consists of a base 11 secured to the end of a sleeve 12 by several leveling screws 13 with a waterproof seal created therebetween by a rubber gasket 14. The sleeve is generally cylindrical in shape and hollow throughout with an interior cavity contoured so as to accept and support various components housed therein and described in further detail below. Fastening threads 15 are located on the outer surface of the sleeve 12 at the end opposite the base 11 and are designed to mate with a standard NPT nipple-type connector (not shown) located on the top of a liquid storage vessel, used to secure the sensor head 10 to the liquid storage vessel and providing fluid connectivity with the interior cavity thereof. In an alternate embodiment, the fastening threads 15 are replaced with a connecting means designed to mate with standard flange connector (not shown) rather than a NPT nipple-type connector.

A window 20 spans the interior cross-section of the sleeve 12 at approximately the midpoint of the length thereof, perpendicular to the longitudinal axis of the sleeve 12, and is secured against an annular window securing ridge 21 contoured on the interior wall of the sleeve 12 by a window retaining ring 22. A window sealing O-ring 23 creates a water tight seal that isolates the interior of the liquid storage vessel from the optical components housed in the base 11. The window 20 is constructed of a high strength material such as borosilicate that, in conjunction with the seal created by the O-ring 23 and the window retaining ring 22, allows the sensor head 10 to withstand high pressure forces created by the liquid within the storage vessel and/or pressure within a sealed vessel.

The base 11 houses the optical components that facilitate the transmission and reception of optical signals from a laser measurement device (not shown). A transmitter lens 30 is secured in a transmitter lens assembly 31 by a transmitter lens retaining ring 32. The transmitter lens 30 is focused by rotating the transmitter lens assembly 31, which is threaded so that the transmitter lens 30 travels linearly in a direction parallel to the longitudinal axis of the sensor head 10. The transmitter lens assembly 31 can be locked in place by a transmitter lens locking screw 33. A receiver lens 35 is secured in a receiver lens assembly 36 by a receiver lens retaining ring 37. The receiver lens 35 is focused it by rotating the receiver lens assembly 36, which is threaded so that the receiver lens 35 travels linearly in a direction parallel to the longitudinal axis of the sensor head 10. The receiver lens assembly 36 can be locked in place by a receiver lens locking screw (not shown). The transmitter lens 30 and the receiver lens 35 are oriented in a manner such that, when the sensor head 10 is assembled, they are directed approximately parallel to the longitudinal axis of the sleeve 12 and aim through the window 20.

Receptacle base fasteners 40 are used to secure a transmitter receptacle base 41, housing a transmitter receptacle 42, to the base 11. Receptacle base fasteners 40 are used to secure a receiver receptacle base 43, housing a receiver receptacle 44, to the base 11. The transmitter receptacle 42 and the receiver receptacle 44 are designed to accommodate standard fiber optic cable connectors (not shown), thus allowing a standard laser measurement device to transmit and receive optical signals through the transmitter lens 30 and the receiver lens 35, respectively.

In an alternative embodiment (not shown), a coaxial arrangement requiring the use of a single transmitting/receiving lens and a single fiber optic cable is used to reduce the number and length of cabling and the number of lenses required to provide the measurements, reducing material and installation costs, without sacrificing accuracy, and allowing for a more compact configuration.

OPERATION OF THE PREFERRED EMBODIMENT

In accordance with a preferred embodiment of the present invention, as shown in FIG. 1, FIG. 2, FIG. 3, FIG. 4 and FIG. 5, the sensor head 10 is used in the following manner:

The optics of the sensor head 10 are factory calibrated in the following steps: The transmitter lens 30 is focused to infinity by adjusting the threaded transmitter lens assembly 34 and locking it into place with the transmitter lens locking screw 33. The receiver lens 35 is then focused to infinity by adjusting the threaded receiver lens assembly 38 and locking it into place with the receiver lens locking screw (not shown). The base 11 is leveled by monitoring the circular bubble level 45. Light exiting the transmitter is aimed vertically down by adjusting the transmitter receptacle base 41 and is locked into place using the receptacle base fasteners 40. Light is sent through the receiver lens 35 is aimed vertically down by adjusting the receiver receptacle base 43 and is locked into place using the receptacle base fasteners 40.

The sensor head 10 is attached to a liquid storage vessel 50 using the fastening threads 15 on the sleeve 12 to connect it to a standard NPT nipple-type connector 51 located on the top of the liquid storage vessel 50 and oriented in a manner such that, when connected, the sensor head 10 is aimed in a direction perpendicular to the liquid surface 52. The angle of the sensor head 10 can be fine tuned by adjusting the leveling screws 13 and monitoring a circular bubble level 45 located on the base 11. The transmitter fibers 55 and the receiver fibers 56 are connected to the transmitter receptacle 42 and the receiver receptacle 44, respectively, using special fiber optic terminating connectors 57 that provide a weatherproof seal. The transmitter fibers 55 and receiver fibers 56 are thereby used to connect the sensor head 10 to a laser measurement device 58.

The laser measurement device 58 is used to monitor and report the level of the liquid contained in the liquid storage vessel 50 by generating pulsed or continuous wave phase lasers and recording the time needed for laser signal to travel from the laser measurement device 58, through the transmitter fibers 55, through the transmitter lens 30 to the liquid surface 52 where it is reflected back to the receiver lens 35, through the receiver fibers 56 and back to the laser measurement device 58. Knowing that the speed that the laser travels is essentially constant and measuring the travel time accurately, the level of the liquid is calculated, automatically, by the laser measuring device 58. This routine is performed in a highly repetitive manner so as to provide a more accurate reading. Of course, calibration is required to compensate for the distance that the laser signal travels through the transmitter fibers 55 and the receiver fibers 56. Furthermore, periodic re-calibration is required in order to account for linear expansion and/or shrinkage of the transmitter fibers 55 and the receiver fibers 56.

In an alternate embodiment, the calibration procedures used to compensate for fiber lengths and linear expansion/shrinkage is avoided by the incorporation of two prisms (not shown) in the sensor head 10. Mounted in the base 11, the prisms are used to reflect a portion of the laser signal from the transmitter lens 30 to the receiver lens 35. The reflected portion of the pulse is used to initiate the timing cycle within the laser measurement device 58, rather than starting the cycle upon generating the laser signal, thus removing the fiber length, and any linear expansion/shrinkage thereof, from the timing cycle.

In an alternate embodiment, several sensor heads 10 can be multiplexed in order to provide redundant level measuring signals within the same vessel or single level indicating signals in multiple tanks to a single laser measurement device 58 by using a standard optical switching device (not shown).

In an alternate embodiment, the calibration procedure used to compensate for fiber lengths and linear expansion/shrinkage is avoided by the incorporation of two 1×2 fiber optic couplers/splitters (not shown) attached to the sensor head 10. One fiber optic coupler/splitter is connected to the transmitter receptacle 42, transmitter fiber 55, and to the second fiber optic coupler/splitter. The second fiber optic coupler/splitter is connected to the receiver receptacle 44, and the receiver fiber 56. This configuration completes a closed loop which allows a portion of the transmitted pulse to be directed back through the receiver fiber 56 to act as a reference signal. The reference signal is used to initiate the timing cycle within the laser measurement device 58, rather than starting the cycle upon generating the pulse, thus removing the fiber length, and any linear expansion/shrinkage thereof, from the timing cycle.

While the preferred embodiments of the invention have been shown, illustrated, and described, it will be apparent to those skilled in this field that various modifications may be made in these embodiments without departing from the spirit of the present invention. It is for this reason that the scope of the invention is set forth in and is to be limited only by the following claims.

What is claimed is:

1. A remote sensor head for laser level measurement in liquid storage vessels, said sensor head comprising:

a sleeve, said sleeve generally cylindrical in shape, with a component end opposite a connecting end, said sleeve being hollow throughout providing fluid connectivity between said component end and said connecting end and forming a sleeve interior cavity;

a base, said base generally cylindrical in shape with a cable end opposite a component end, said base being hollow on said component end and forming a base interior cavity, said base connected to said sleeve at said component end by a plurality of leveling screws such that the longitudinal axis of said base is parallel to the longitudinal axis of said sleeve and such that said base interior cavity is in fluid communication with said sleeve interior cavity;

a transmitter lens assembly, said transmitter lens assembly having a generally cylindrical shape, said transmitter lens assembly being hollow throughout with a transmitter lens assembly cable end in fluid communication with a transmitter lens assembly component end, said transmitter lens assembly secured to said base interior cavity in a manner such that the longitudinal axis of said transmitter lens assembly is parallel to the longitudinal axis of said sleeve and said base and such that said transmitter lens assembly component end is in fluid communication with said sleeve interior cavity and said base interior cavity;

a receiver lens assembly, said receiver lens assembly being generally cylindrical in shape and hollow throughout with a receiver lens assembly cable end in fluid communication with a receiver lens assembly component end, said receiver lens assembly secured to said base interior cavity in a manner such that the longitudinal axis of said receiver lens assembly is parallel to the longitudinal axis of said sleeve and said base and such that said receiver lens assembly component end is in fluid communication with said sleeve interior cavity and said base interior cavity;

a window, said window affixed perpendicular to the longitudinal axis of said sleeve interior cavity and spanning the interior cross-section of said sleeve and secured by a window retaining ring;

a transmitter lens, said transmitter lens affixed in said transmitter lens assembly perpendicular to the longitudinal axis of said transmitter lens assembly and secured by a transmitter lens retaining ring; and a receiver lens, said receiver lens affixed in said receiver lens assembly perpendicular to the longitudinal axis of said receiver lens assembly and secured by a receiver lens retaining ring.

2. The sensor head of claim 1, wherein said base further comprises:

a transmitting lens aperture, said transmitting lens aperture generally cylindrical in shape with a threaded connecting means along the interior surface thereof and providing fluid connectivity between said base interior cavity and said base cable end; and a receiving lens aperture, said receiving lens aperture generally cylindrical in shape with a threaded connecting means along the interior surface thereof and providing fluid connectivity between said base interior cavity and said base cable end.

3. The sensor head of claim 2, wherein said sensor head further comprises:

a transmitter receptacle base, said transmitter receptacle base generally cylindrical in shape and hollow throughout with a transmitter receptacle base cable end in fluid communication with a transmitter receptacle base component end, said transmitter receptacle base secured to said base cable end in a manner such that the longitudinal axis of said transmitter receptacle base is parallel to the longitudinal axis of said base and such that said transmitter receptacle base component end is in fluid communication with said transmitter lens aperture;

a receiver receptacle base, said receiver receptacle base generally cylindrical in shape and hollow throughout with a receiver receptacle base cable end in fluid communication with a receiver receptacle base component end, said receiver receptacle base secured to said base cable end in a manner such that the longitudinal axis of said receiver receptacle base is parallel to the longitudinal axis of said base and such that said receiver receptacle base component end is in fluid communication with said receiver lens aperture;

a transmitter fiberoptic terminating connector, said transmitter fiberoptic terminating connector affixed to said transmitter receptacle base cable end, facilitating connection of said transmitter fiberoptic terminating connector to the transmitter fiberoptic cable of a laser measurement device such that an optical laser measurement signal can be transmitted by said laser measurement device through said transmitter lens; and a receiver fiberoptic terminating connector, said receiver fiberoptic terminating connector affixed to said receiver receptacle base cable end, facilitating connection of said receiver fiberoptic terminating connector to the receiver fiberoptic cable of said laser measurement device such that an optical laser measurement signal can be received by said laser measurement device through said receiver lens.

4. The sensor head of claim 3, wherein said transmitter lens assembly further comprises a transmitter lens assembly threaded connecting means on the exterior surface thereof, said transmitter lens assembly threaded connecting means securing said transmitter lens assembly to said base interior cavity in a manner such that the distance between said transmitter lens and said laser measurement device transmitter fiberoptic cable can be adjusted by rotating said transmitter lens assembly and locked in place using a transmitter lens assembly locking screw.

5. The sensor head of claim 3, wherein said receiver lens assembly further comprises a receiver lens assembly threaded connecting means on the exterior surface thereof, said receiver lens assembly threaded connecting means securing said receiver lens assembly to said base interior cavity in a manner such that the distance between said receiver lens and said laser measurement device receiver fiberoptic cable can be adjusted by rotating said receiver lens assembly and locked into place using a receiver lens assembly locking screw.

6. The sensor head of claim 3, wherein said sleeve further comprises a sleeve threaded connecting means the exterior surface of said sleeve component end that facilitates connection to a standard NPT nipple-type connector.

7. The sensor head of claim 3, wherein said sleeve further comprises a sleeve flanged connecting means the exterior surface of said sleeve component end that facilitates connection to a standard flange connector.

8. The sensor head of claim 3, wherein a waterproof seal is created between said base and said sleeve, between said window and said sleeve interior cavity, between said transmitter fiberoptic terminating connector and said transmitter receptacle base cable end, and between said receiver fiberoptic terminating connector and said receiver receptacle base cable end, said waterproof seal created by a device selected from the group comprising O-rings, gaskets and washers.

9. The sensor head of claim 3, wherein said sensor head facilitates the use or remotely located laser measurement devices to calculate the level of a liquid in a liquid storage vessel, connecting said sensor head to the top surface of said liquid storage vessel in a manner such that the sleeve interior cavity is in fluid connectivity with the interior cavity of said liquid storage vessel and oriented such that the longitudinal axis of said sensor head is perpendicular to the surface of the liquid contained within said liquid storage vessel.

* * * * *